United States Patent Office 3,521,896
Patented July 28, 1970

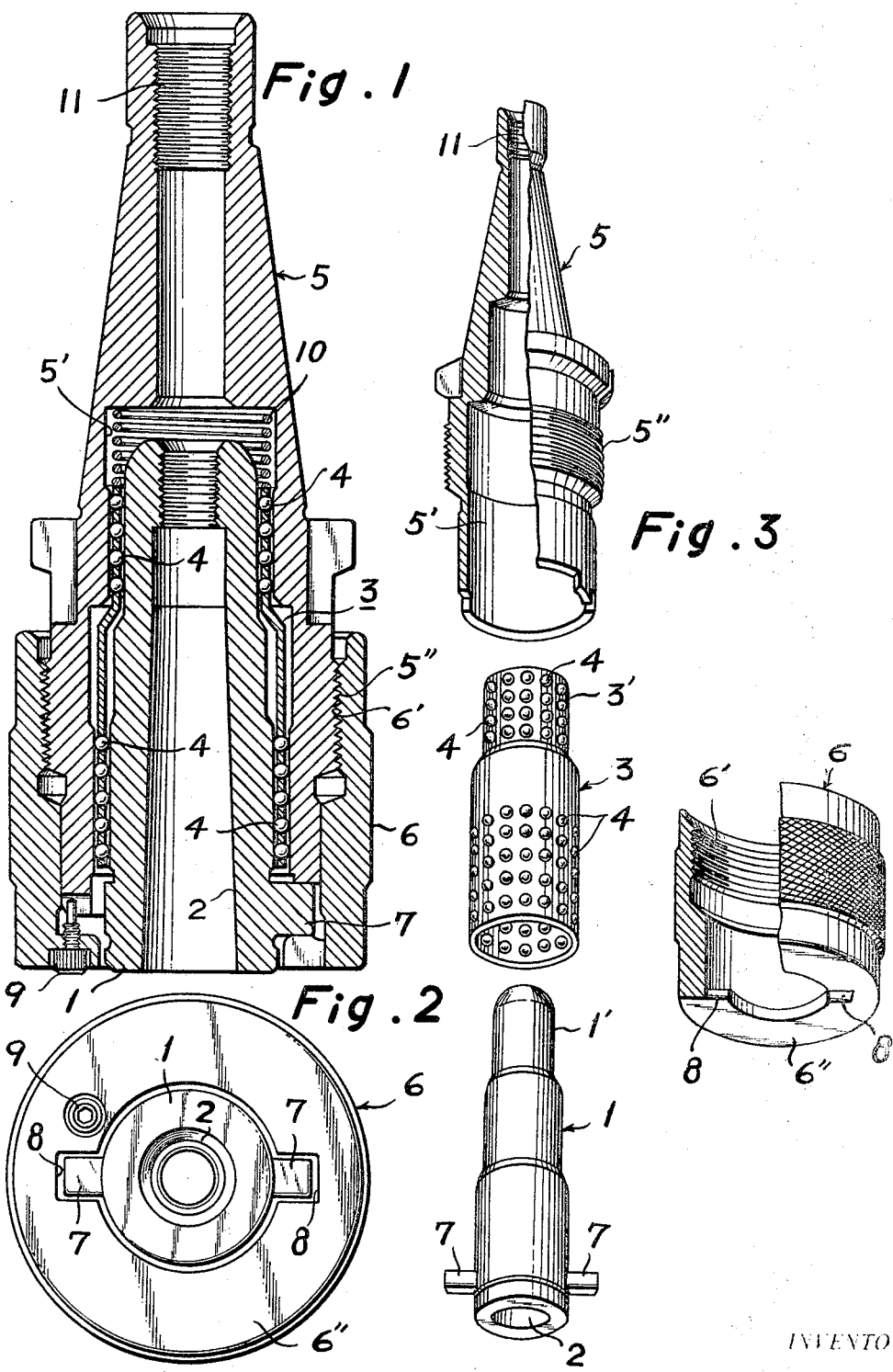

3,521,896
CHUCK
Masakazu Matsumoto, 1945 Ishikirimachi Higashi-Osaka-shi, Osaka-fu, Japan
Filed May 28, 1968, Ser. No. 732,668
Int. Cl. B23b 31/06, 31/20
U.S. Cl. 279—91                              1 Claim

ABSTRACT OF THE DISCLOSURE

A chuck which is quickly interchangeable of tools in a machine tool, and comprises a collet whereby a tool shank is held and which has a plurality of lugs; a bearing holder set within the adaptor, supported by a spring at its end, shaped similar to the collet, and possessed of ball bearings; and a locking ring fitted outside of the adaptor and having notches through which the lugs of said collet may smoothly pass.

---

This invention relates to a new and useful improvement in a quickly interchangeable chuck whereby a quick change may be made from one type or size of a cutting tool to another type or size of cutting tool.

Heretofore, it has been very difficult to make a quick change, especially, in inserting into an adaptor a collet for holding the tool shank in a machine tool. That is to say, those chucks of which the collet may be inserted into the adaptor with great ease are spaceful and loose while, conversely, those of which both the collet and the adaptor are closely fitted to each other are not loose but difficult disadvantageously in inserting the former into the latter quickly and accurately.

It is the object of this invention to eliminate the aforementioned shortcoming and provide a structure whereby a quick change of tools may be effected without the loss of accuracy.

Other objects and advantages of the invention will hereinafter appear with an embodiment of the invention in reference to the drawings in which:

FIG. 1 is a side elevational view of the chuck of the invention;

FIG. 2 is a view of the bottom of the chuck, that is, the frontal view of the locking ring; and FIG. 3 is a perspective view of the chuck with a part broken away, illustrating its component members.

In the drawings it is indicated that: numeral 1 denotes a collet which has a hollow section 2, for holding a tool shank internally; the external periphery of said collet has a reduced diameter end 1'. Numeral 3 denotes a bearing holder which is located outside of said collet and closely houses it; said bearing holder 3 is shaped similar to the collet, tapered off toward its fore end 3' while it is provided on its entire surface with ball bearings 4. Numeral 5 denotes an adaptor in whose inner hollow section 5' there are inserted freely removably and detachably said collet as well as said bearing holder 3 housing said collet. Numeral 6 denotes a locking ring which is fitted outside of the adaptor 5; a female screw 6' provided inside of the locking ring 6 is screwed into a male screw 5" of the adaptor 5; and said collet 1 is locked by turning said locking ring 6 in the one direction.

The bottom 6" of said locking ring 6 is provided with notches 8 through which a pair of diametrically opposite lugs 7 formed on the tapered body of the collet 1 can pass smoothly so that said collet may be accurately retained as it should be therein by turning and tightening the locking ring 6.

Numeral 9 denotes a bolt for positioning and aligning the notches 8 of the locking ring 6 and that of the adaptor 5. Numeral 10 denotes a spring which is provided at the end of the hollow section 5' of the adaptor 5 and is in contact with the fore end of the bearing holder 3.

Numeral 11 is of a threaded part where the spindle is coupled.

The present invention being comprised as described in the foregoing, the collet 1, in particular, may be quickly inserted into a well as removed from the adaptor 5, and for this purpose, the collet insertion part 5' of the adaptor 5 is provided with the bearing holder 3 having entirely thereover the ball bearings and shaped similar to the collet, so that the collet 1 may be inserted into the hollow section of the adaptor 5 by sliding forward inside of the bearing holder 3. Therefore, the quick change may be made extremely smoothly according to this invention, in which the collet insertion into the adaptor can be effected easily because the collet 1 and the bearing holder 3 are tapered toward the fore end 1' and 3'.

When the collet 1 is inserted into the adaptor 5, the bearings 4 of the bearing holder 3 will turn, and accelerate the smooth movement of the collet 1, and furthermore, the bearing holder 3 itself will also make a forward movement, though insignificant in amount, so as to compress the spring 10. Thereafter, the collet 1 will not slip out readily once it has been inserted into the adaptor 5, and therefore, the lugs 7 are provided on the body of the collet, said lugs 7 being able to be engaged with the notches 8 of both the adaptor 5 and the locking ring 6, as is shown in FIG. 2; further, the lugs 7 having been forced inwardly of the notches 8, the lugs 7 of the collet 1 will be retained as it should be inside of the bottom 6' of the locking ring 6 by the turning of said locking ring 6.

Further, when the collet 1 is drawn out of the adaptor 5, the locking ring 6 is to be turned the other way unlike previously, so that the notches 8 of the locking ring 6 will fall again onto the lugs 7 of the collet 1 to unfasten the locking by the bottom 6' of the locking ring 6, and thence, the bearing holder 3 will be returned back to its original position by the spring 10. Thereupon, the lugs 7 of the collet 1 will slip away slightly outwardly from the notches 8, so that the collet may be easily removed off to the outside.

From the foregoing description it will be understood that the chuck of the present invention may quickly and accurately interchange the collet in the adaptor.

While a particular embodiment of this invention has been illustrated and described, modifications thereof will readily occur to those skilled in the art. It should be understood therefore that the invention is not limited to the particular arrangement disclosed hereinabove but that the appended claim is intended to cover all modifications which do not depart from the true spirit and scope of the invention.

What is claimed is:

1. A chuck which comprises a collet having a hollow section therethrough adapted to hold a tool shank therein, said collet having a plurality of projecting lugs provided on its main body that is tapered toward its fore end; a bearing holder positioned in the internal hollow section of an adaptor of said chuck and supported resiliently by a spring at its end, said bearing holder being shaped similar to said collet and having ball bearings over its entire periphery; and a locking ring the bottom of which is fitted telescopically outside of said adaptor, said locking ring having notches through which said lugs of said collet may smoothly pass.

References Cited

UNITED STATES PATENTS

| | | | |
|---|---|---|---|
| 1,193,044 | 8/1916 | Minnich | 279—90 |
| 2,605,110 | 7/1952 | Blum | 279—102 XR |
| 3,224,784 | 12/1965 | Harbart | 279—102 XR |

ROBERT C. RIORDON, Primary Examiner

D. D. EVENSON, Assistant Examiner